United States Patent
Boualleg

(10) Patent No.: US 12,551,872 B2
(45) Date of Patent: *Feb. 17, 2026

(54) METHOD FOR PREPARING A CATALYST CONTAINING AN ACTIVE NICKEL PHASE DISTRIBUTED IN A SHELL AND A NICKEL-COPPER ALLOY

(71) Applicant: IFP Energies nouvelles, Rueil-Malmaison (FR)

(72) Inventor: Malika Boualleg, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 565 days.

This patent is subject to a terminal disclaimer.

(21) Appl. No.: 17/923,353

(22) PCT Filed: May 18, 2021

(86) PCT No.: PCT/EP2021/063045
§ 371 (c)(1),
(2) Date: Nov. 4, 2022

(87) PCT Pub. No.: WO2021/239496
PCT Pub. Date: Dec. 2, 2021

(65) Prior Publication Data
US 2023/0201809 A1    Jun. 29, 2023

(30) Foreign Application Priority Data
May 29, 2020   (FR) ........................................ 2005682

(51) Int. Cl.
*B01J 21/04*   (2006.01)
*B01J 23/755*   (2006.01)
(Continued)

(52) U.S. Cl.
CPC ............. *B01J 23/755* (2013.01); *B01J 21/04* (2013.01); *B01J 35/397* (2024.01);
(Continued)

(58) Field of Classification Search
CPC ........ B01J 21/04; B01J 23/755; B01J 35/397; B01J 37/0203; B01J 37/0207; C07C 2523/755; C10G 45/36; C10G 45/48
See application file for complete search history.

(56) References Cited

U.S. PATENT DOCUMENTS 4,490,480 A * 12/1984 Lok ...................... C07C 1/0435
518/715
4,519,951 A * 5/1985 Qualeatti ................ C11C 3/126
554/144
(Continued)

FOREIGN PATENT DOCUMENTS

WO    2005094418 A2    10/2005
WO    WO-2019201617 A1 * 10/2019 ............. C10G 45/48
(Continued)

OTHER PUBLICATIONS

Uemura et al., Characterization of Nickel-Alumina Catalysts Impregnated in Alcohol Solution, The Japan Petroleum Institute, Sekiyu Gakkaishi, 30, (1), 53-58 (1987).*
(Continued)

*Primary Examiner* — Jun Li
(74) *Attorney, Agent, or Firm* — Csaba Henter; MILLEN, WHITE, ZELANO & BRANIGAN

(57) ABSTRACT

A process for preparing a catalyst comprising nickel and copper, comprising the following steps:
  impregnating the porous support with a volume of a butanol solution of between 0.2 and 0.8 times the total pore volume of the support;
  maturing the impregnated porous support for 0.5 to 40 hours;

(Continued)

impregnating the matured impregnated support with a solution comprising a precursor of the nickel active phase;

impregnating the support with a solution containing a copper precursor and a nickel precursor.

14 Claims, 1 Drawing Sheet

(51) Int. Cl.
*B01J 35/00* (2024.01)
*B01J 35/10* (2006.01)
*B01J 35/30* (2024.01)
*B01J 37/02* (2006.01)
*C07C 5/10* (2006.01)

(52) U.S. Cl.
CPC ....... *B01J 37/0205* (2013.01); *B01J 37/0207* (2013.01); *C07C 5/10* (2013.01); *C07C 2523/72* (2013.01); *C07C 2523/755* (2013.01)

(56) References Cited

U.S. PATENT DOCUMENTS

| | | | |
|---|---|---|---|
| 7,737,075 B2 | 6/2010 | Ryu | |
| 8,637,719 B2 | 1/2014 | Fischer et al. | |
| 11,364,490 B2 * | 6/2022 | Boualleg | B01J 6/001 |
| 11,951,456 B2 * | 4/2024 | Boualleg | B01J 37/024 |
| 12,064,751 B2 * | 8/2024 | Dubreuil | B01J 35/613 |
| 12,083,506 B2 * | 9/2024 | Dubreuil | B01J 35/45 |
| 12,121,882 B2 * | 10/2024 | Dubreuil | B01J 37/16 |
| 2010/0217052 A1 | 8/2010 | Ungar et al. | |
| 2012/0065442 A1 | 3/2012 | Geyer et al. | |
| 2015/0099622 A1 | 4/2015 | Ko et al. | |
| 2022/0266225 A1 * | 8/2022 | Dubreuil | C10G 45/48 |

FOREIGN PATENT DOCUMENTS

| | | | | |
|---|---|---|---|---|
| WO | WO-2019201618 A1 * | 10/2019 | | C10G 45/48 |
| WO | 2021018601 A1 | 2/2021 | | |
| WO | WO-2021018600 A1 * | 2/2021 | | B01J 37/0205 |
| WO | WO-2021018602 A1 * | 2/2021 | | B01J 37/08 |
| WO | WO-2021018603 A1 * | 2/2021 | | B01J 35/45 |

OTHER PUBLICATIONS

Goula et al. (Nickel on alumina catalysts for the production of hydrogen rich mixtures via the biogas dry reforming reaction: Influence of the synthesis method, International Journal of Hydrogen Energy vol. 40, Issue 30, Aug. 10, 2015, pp. 9183-9200).*

Jang Min-Su et al: "Facile preparation of egg-shell-type pellet catalysts using immiscibility between hydrophobic solvent and hydrophilic solution: Enhancement of catalytic activity due to position control of metallic nickel inside alumina pellet", Applied Catalysis A: General, Elsevier, Amsterdam, NL, vol. 530, Nov. 16, 2016 (Nov. 16, 2016), pp. 211-216, XP029858638, ISSN: 0926-860X, DOI: 10.1016/J.APCATA.2016.11.025.

International Search Report PCT/EP2021/063045 dated Jul. 16, 2021 (pp. 1-2).

* cited by examiner

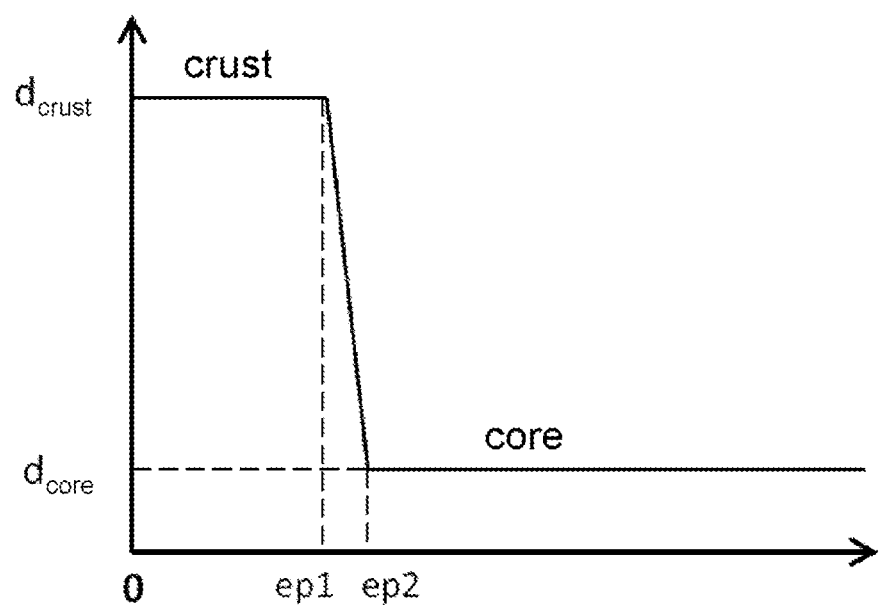

METHOD FOR PREPARING A CATALYST CONTAINING AN ACTIVE NICKEL PHASE DISTRIBUTED IN A SHELL AND A NICKEL-COPPER ALLOY

TECHNICAL FIELD

The present invention relates to a process for preparing a supported metal catalyst based on nickel intended particularly for the hydrogenation of unsaturated hydrocarbons, and more particularly for the selective hydrogenation of polyunsaturated compounds or the hydrogenation of aromatics.

PRIOR ART

Monounsaturated organic compounds, such as, for example, ethylene and propylene, are at the root of the manufacture of polymers, of plastics and of other chemicals having added value. These compounds are obtained from natural gas, from naphtha or from gas oil which have been treated by steam cracking or catalytic cracking processes. These processes are carried out at high temperature and produce, in addition to the desired monounsaturated compounds, polyunsaturated organic compounds, such as acetylene, propadiene and methylacetylene (or propyne), 1,2-butadiene and 1,3-butadiene, vinylacetylene and ethylacetylene, and other polyunsaturated compounds, the boiling point of which corresponds to the C5+ gasoline fraction (gasolines containing hydrocarbon compounds having 5 or more carbon atoms), in particular styrene or indene compounds. These polyunsaturated compounds are highly reactive and result in side reactions in the polymerization units. It is thus necessary to remove them before making economic use of these fractions. Selective hydrogenation is the main treatment developed to specifically remove undesirable polyunsaturated compounds from these hydrocarbon feedstocks. It enables the conversion of polyunsaturated compounds to the corresponding alkenes or aromatics while avoiding the complete saturation thereof and thus the formation of the corresponding alkanes or naphthenes.

Selective hydrogenation catalysts are generally based on metals from Group VIII of the Periodic Table, preferably palladium or nickel. The metal is provided in the form of metal particles deposited on a support. The metal content, the size of the metal particles and the distribution of the active phase in the support are among the criteria which have an influence on the activity and the selectivity of the catalysts.

The macroscopic distribution of the metal particles in the support constitutes an important criterion, mainly in the context of rapid and consecutive reactions such as selective hydrogenations. It is generally desirable for these elements to be located in a crust at the periphery of the support in order to avoid problems of intragranular material transfer which may result in activity defects and a loss of selectivity. Such catalysts are also referred to as "eggshell" catalysts.

Such catalysts are widely known in the case of selective hydrogenation catalysts based on palladium. Indeed, owing to the low palladium content (generally less than 1% by weight (1 wt %) of palladium relative to the catalyst) and suitable preparation processes, a thin crust of palladium at the periphery of the support grains can be obtained (FR2922784, US2010/217052).

It is often proposed to replace palladium with nickel, a metal which is less active than palladium, and which it is therefore necessary to have in a larger amount in the catalyst. Thus, nickel-based catalysts generally have a metal content of between 5% and 50% by weight of nickel relative to the catalyst. In these catalysts, the nickel is generally distributed homogeneously within the support. One possible way of improving these catalysts in terms of activity and selectivity is to control the distribution of nickel within the support by depositing the nickel in a more concentrated manner on a crust, at the periphery of the support. Such catalysts are known from the prior art.

Document U.S. Pat. No. 4,519,951 describes an "eggshell" catalyst with nickel on a porous support having a pore volume of at least 0.2 ml/g for the pores having a size of less than 11.7 nm and a pore volume of at least 0.1 ml/g for the pores having a size of greater than 11.7 nm. More than 50% by weight of the nickel is found in a crust, the thickness of which is equal to 0.15 times the radius of the support. This catalyst is used for the hydrogenation of fats.

Document CN101890351 describes a supported nickel catalyst in which more than 90% by weight of the nickel is found in a 700 μm-thick crust. The catalyst is prepared using an ammoniacal solution to dissolve the nickel salt. These catalysts are used in a selective hydrogenation application.

Document US 2012/0065442 describes a supported nickel catalyst with the nickel distributed both on a crust with a thickness of 3% to 15% of the diameter and at the core, the nickel concentration ratio between the crust and the core being between 3.0:1 and 1.3:1. The nickel active phase is deposited by spray coating of an ammoniacal solution of a nickel salt on the support.

French patent application filed under no. 19/08.719 by the applicant describes a process for preparing a nickel-based catalyst on an alumina support obtained according to a very specific method, the nickel being distributed both on a crust at the periphery of the support, and at the core of the support, the thickness of said crust being between 2% and 15% of the diameter of the catalyst. The process for preparing such a catalyst requires firstly the use of a specific alumina support that has undergone a hydrothermal treatment in the presence of an acid solution, and secondly the implementation of a step of hydrothermal treatment after adding a specific organic additive to the catalyst precursor.

SUBJECTS OF THE INVENTION

The present invention thus relates to a new process for preparing a catalyst which makes it possible to obtain a catalyst comprising performance qualities at least as good, or even better, in terms of activity and selectivity within the context of the selective hydrogenation reactions of polyunsaturated compounds or hydrogenation reactions of aromatics, while using a lower effective amount of nickel phase (i.e. an amount of nickel located ultimately in the crust at the periphery of the support allowing the selective hydrogenation reactions or hydrogenation reactions of aromatics to be carried out) than the amount typically used in the prior art, owing in particular to a better distribution of the active nickel phase in the support, making the latter more accessible to the reagents.

One subject of the present invention is a process for preparing a catalyst comprising nickel and copper, in a proportion of 1% to 50% by weight of nickel element relative to the total weight of the catalyst, and in a proportion of 0.5% to 15% by weight of copper element relative to the total weight of the catalyst, and a porous alumina support, the nickel being distributed both over a crust at the periphery of the support, and at the core of the support, the thickness of said crust being between 2% and 15% of the diameter of the catalyst, the size of the nickel particles in the catalyst, measured in oxide form, being between 7 nm and 25 nm, said process comprises the following steps:

a) the porous support is impregnated with a volume V1 of a butanol solution of between 0.2 and 0.8 times the total pore volume TPV of said support in order to obtain an impregnated support;

b) the impregnated porous support obtained at the end of step a) is left to mature for 0.5 hour to 40 hours;

c) the sequence of the following sub-steps is carried out:
   c1) either the matured impregnated porous support obtained at the end of step b), or the catalyst precursor obtained at the end of step d), is impregnated with a solution comprising at least one precursor of the nickel active phase;
   c2) optionally, the catalyst precursor obtained at the end of step c1) is dried at a temperature below 250° C.;

d) the sequence of the following sub-steps is carried out:
   d1) either the porous support, or the matured impregnated porous support obtained at the end of step b), or the catalyst precursor obtained at the end of step c), is impregnated with at least one solution containing at least one copper precursor and one nickel precursor at a desired copper concentration in order to obtain, on the final catalyst, a content of between 0.5% and 15% by weight of copper element relative to the total weight of the final catalyst;
   d2) optionally, the catalyst precursor obtained at the end of step d1) is dried at a temperature below 250° C.;

said step d) being carried out either before step a), or between steps b) and c), or after step c), it being understood that:

i) when step d) is carried out before step a), then sub-steps c2) and d2) are compulsory;
ii) when step d) is carried out between steps b) and c), then sub-step c2) is compulsory;
iii) when step d) is carried out after step c), then sub-step d2) is compulsory.

Surprisingly, the applicant has discovered that carrying out a particular step of impregnating a butanol solution on a porous alumina support, regardless of its origin, followed by a maturation step before the step of adding the precursor of the active nickel phase to said matured impregnated support, and this without carrying out an intermediate drying step between the impregnation of the butanol and the impregnation of the precursor of the active nickel phase, makes it possible to obtain a catalyst in which at least one portion of the nickel is distributed over a crust at the periphery of the support, the other portion of the nickel being distributed in the core of the catalyst. Without wishing to be bound by any theory, the presence of butanol limits the migration of the active nickel phase to the core of the support. This is because only a portion of the porosity is occupied by the butanol. The maturation step allows the butanol solution to migrate to the core of the support and to liberate a "ring of free pores" at the periphery of the support accessible by the nickel during the step of impregnation of the precursor of the active phase. In addition, since the butanol and water are poorly miscible, the butanol layer constitutes a barrier that limits the diffusion of nickel to the core of the support. Furthermore, the presence on the catalyst of an NiCu alloy enables these catalysts to be reduced in situ in the reactor before hydrogenation and this at very low temperatures compared to the conventional reduction temperature, which reduction thus takes place ex situ and which therefore requires an additional passivation step.

Preferably, said process further comprises a step e) wherein the catalyst precursor obtained at the end of the sequence of steps a) to d) is reduced by bringing said catalyst precursor into contact with a reducing gas at a temperature above or equal to 150° C. and below 250° C.

Preferably, step b) is carried out at a temperature below or equal to 60° C.

Preferably, in step a), a solution of n-butanol is used.

In one embodiment according to the invention, when step d) is carried out before step a), the volume V2 of the solution comprising at least one precursor of the nickel active phase supplied in step c1) is preferably such that V2=TPV−V1.

In one embodiment according to the invention, wherein step d) is carried out between steps b) and c), or after step c), the volume V2 of the solution comprising at least one precursor of the nickel active phase supplied in step c1) and the volume V3 of the solution comprising a nickel precursor and a copper precursor supplied in step d1) are such that V2+V3=TPV−V1.

Preferably, the copper precursor is chosen from copper acetate, copper acetylacetonate, copper nitrate, copper sulfate, copper chloride, copper bromide, copper iodide or copper fluoride.

Preferably, the precursor of the nickel active phase is nickel nitrate, nickel chloride, nickel acetate or nickel hydroxycarbonate.

In one embodiment according to the invention, said process further comprises a step c2') of calcining the dried catalyst precursor obtained at the end of step c2) at a temperature of between 250° C. and 600° C.

Preferably, in step a), said volume V1 of said butanol solution is between 0.25 and 0.75 times the total pore volume TPV of said support.

Preferably, the sub-steps c2) and/or d2) are carried out for a time of between 0.5 hour and 12 hours.

Another subject according to the invention relates to a catalyst that can be obtained via the process according to the invention.

Another subject according to the invention relates to a process for the selective hydrogenation of polyunsaturated compounds containing at least 2 carbon atoms per molecule, contained in a hydrocarbon feedstock having a final boiling point below or equal to 300° C., said process being carried out at a temperature of between 0° C. and 300° C., at a pressure of between 0.1 MPa and 10 MPa, at a hydrogen/(polyunsaturated compounds to be hydrogenated) mole ratio of between 0.1 and 10 and at an hourly space velocity of between 0.1 $h^{-1}$ and 200 $h^{-1}$ when the process is carried out in the liquid phase, or at a hydrogen/(polyunsaturated compounds to be hydrogenated) mole ratio of between 0.5 and 1000 and at an hourly space velocity of between 100 $h^{-1}$ and 40 000 $h^{-1}$ when the process is carried out in the gas phase, in the presence of a catalyst according to the invention or obtained according to the preparation process according to the invention.

Another subject according to the invention relates to a process for the hydrogenation of at least one aromatic or polyaromatic compound contained in a hydrocarbon feedstock having a final boiling point below or equal to 650° C., said process being carried out in the gas phase or in the liquid phase, at a temperature of between 30° C. and 350° C., at a pressure of between 0.1 and 20 MPa, at a hydrogen/(aromatic compounds to be hydrogenated) mole ratio of between 0.1 and 10 and at an hourly space velocity of between 0.05 $h^{-1}$ and 50 $h^{-1}$, in the presence of a catalyst according to the invention or obtained according to the preparation process according to the invention.

BRIEF DESCRIPTION OF THE DRAWING

FIG. 1 is a diagram showing the distribution of nickel in the catalyst. The x-axis corresponds to the thickness of the catalyst, measured from the edge of the catalyst (in µm). The y-axis corresponds to the nickel density (in grams of Ni/mm$^3$). The nickel is distributed both on a crust at the periphery of the support, of thickness ep1, and in the core of the support. The nickel density on the crust $d_{crust}$ is greater than the nickel density in the core of the support $d_{core}$. The transition interval between the core and the crust of the catalyst has a thickness denoted ep2–ep1.

DETAILED DESCRIPTION OF THE INVENTION

1. Definitions

In the text hereinbelow, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

In the present description, according to the IUPAC convention, "micropores" are understood to mean the pores having a diameter of less than 2 nm, i.e. 0.002 µm; "mesopores" are understood to mean the pores having a diameter of greater than 2 nm, i.e. 0.002 µm, and less than 50 nm, i.e. 0.05 µm, and "macropores" are understood to mean the pores having a diameter of greater than 50 nm, i.e. 0.05 µm.

In order to analyze the distribution of the metallic phase on the support, a crust thickness is measured by Castaing microprobe (or electron microprobe microanalysis). The device used is a CAMECA XS100, equipped with four monochromator crystals allowing the simultaneous analysis of four elements. The Castaing microprobe analysis technique consists of the detection of X-rays emitted by a solid after excitation of its elements by a high-energy electron beam. For the purposes of this characterization, the catalyst grains are coated in blocks of epoxy resin. These blocks are polished until the cross section through the diameter of the beads or extrudates is reached, and then metallized by depositing carbon in a metal evaporator. The electron probe is scanned along the diameter of five beads or extrudates to obtain the mean distribution profile of the constituent elements of the solids. This method, well known to those skilled in the art, is defined in the publication by L. Sorbier et al. "*Measurement of palladium crust thickness on catalyst by EPMA*" Materials Science and Engineering 32 (2012). It makes it possible to establish the distribution profile of a given element, here nickel, within the grain. Furthermore, the Ni concentration is defined for each measurement and therefore for each analysis step. The density of Ni within the grain is therefore defined as the concentration of Ni per mm$^3$.

The total pore volume is measured by mercury porosimetry according to the standard ASTM D4284-92 with a wetting angle of 140°, for example using an Autopore III™ model device from the brand Micromeritics™.

The BET specific surface area is measured by nitrogen physisorption according to the standard ASTM D3663-03, a method described in the work by Rouquerol J., Rouquerol F. and Singh K., "*Adsorption by Powders & Porous Solids: Principles, Methodology and Applications*", Academic Press, 1999).

The median mesopore diameter is also defined as being the diameter such that all the pores, among the combined pores constituting the mesopore volume, with a size of less than this diameter constitute 50% of the total mesopore volume determined by mercury porosimetry intrusion.

The term "size of the nickel particles" is understood to mean the diameter of the nickel crystallites in oxide form. The diameter of the nickel crystallites in oxide form is determined by X-ray diffraction, from the width of the diffraction line located at the angle 2θ=43° (that is to say, along the crystallographic direction [200]) using the Scherrer relationship. This method, used in X-ray diffraction on polycrystalline samples or powders, which links the full width at half maximum of the diffraction peaks to the size of the particles, is described in detail in the reference: Appl. Cryst. (1978), 11, 102-113, "Scherrer after sixty years: A survey and some new results in the determination of crystallite size", J. I. Langford and A. J. C. Wilson.

The content of nickel and copper is measured by X-ray fluorescence.

2. Process for Preparing the Catalyst

The steps of said preparation process are described in detail below.

Step a)

According to step a) of the process, the alumina support is impregnated with a volume V1 of a butanol solution of between 0.2 and 0.8 times the total pore volume (also referred to here as TPV) of said support to be impregnated, preferably between 0.25 and 0.75.

Butanol is understood to mean the organic compounds comprising an alcohol function corresponding to the empirical chemical formula $C_4H_{10}O$. Butanol is thus understood to mean the family of the following organic compounds: butan-1-ol (or n-butanol), butan-2-ol, isobutanol, and tert-butanol. Preferably, step a) is carried out in the presence of butan-1-ol.

Step b)

After step a), the impregnated support is matured in the wet state for 0.5 hour to 40 hours, preferably for 1 hour to 30 hours. The maturation step b) is preferably carried out at a temperature below or equal to 60° C., and more preferentially at ambient temperature. This step enables the migration of the butanol solution to the core of the support.

Step c)

Step c1)

During step c1) of the process, the matured impregnated porous alumina support obtained at the end of step b) is impregnated with a solution comprising at least one precursor of the nickel active phase in order to obtain a catalyst precursor. The impregnation step can be carried out according to methods that are well known to those skilled in the art.

The pH of said solution comprising at least one precursor of the impregnated nickel active phase can be modified by the optional addition of an acid or a base.

Preferably, said nickel precursor is introduced in aqueous solution, for example in nitrate, carbonate, acetate, chloride or oxalate form, in the form of complexes formed by a polyacid or an acid alcohol and its salts, in the form of complexes formed with acetylacetonates or in the form of any other inorganic derivative soluble in aqueous solution, which is brought into contact with said support. Preferably, use is advantageously made, as nickel precursor, of nickel nitrate, nickel chloride, nickel acetate or nickel hydroxycarbonate. Very preferably, the nickel precursor is nickel nitrate.

The concentration of nickel in solution is adjusted depending on the pore volume of the support still available so as to obtain, for the supported catalyst, a nickel content of between 1% to 50% by weight of nickel element relative to the total weight of the catalyst, more preferentially between 2% and 40% by weight and even more preferentially between 3% and 35% by weight and even more preferentially 5% and 25% by weight.

Step c2)

In one embodiment according to the invention, a step c2) of drying the catalyst precursor obtained at the end of step c1) is carried out. The drying step c2) is advantageously carried out at a temperature below 250° C., preferably between 15° C. and 180° C., more preferentially between 30° C. and 160° C., even more preferentially between 50° C. and 150° C., and even more preferentially between 70° C. and 140° C., for a period of typically between 0.5 hour to 12 hours, and even more preferably for a period of 0.5 hour to 5 hours. Longer periods of time are not ruled out but do not necessarily provide any improvement.

The drying step can be carried out by any technique known to those skilled in the art. It is advantageously carried out under an inert atmosphere or under an oxygen-containing atmosphere or under a mixture of inert gas and oxygen. It is advantageously performed at atmospheric pressure or at reduced pressure. Preferably, this step is carried out at atmospheric pressure and in the presence of air or nitrogen.

Step c2) is not optional when step d) is carried out before step a) or between steps b) and c). In these cases, at the end of step c2), the total or partial presence, or the absence, of the butanol solution in the catalyst has no effect on the activity and/or the selectivity of the catalyst in the context of the selective hydrogenation of polyunsaturated compounds or the hydrogenation of aromatic compounds.

Step c2')

In one embodiment according to the invention, a step c2') of calcining the dried catalyst precursor obtained at the end of step c2) is carried out at a temperature of between 250° C. and 600° C. The calcining step c2') can be carried out at a temperature of between 250° C. and 600° C., preferably between 350° C. and 550° C., for a period typically of between 0.5 hour and 24 hours, preferably for a period of 0.5 hour to 12 hours, and even more preferably for a period of 0.5 hour to 10 hours, preferably under an inert atmosphere or under an oxygen-containing atmosphere. Longer periods of time are not ruled out but do not necessarily provide any improvement.

At the end of step c2'), the total or partial presence, or the absence, of the butanol solution in the catalyst has no effect on the activity and/or the selectivity of the catalyst in the context of the selective hydrogenation of polyunsaturated compounds or the hydrogenation of aromatic compounds.

Step d)
Step d1)

During step d1) of the process, either the porous support, or the matured impregnated porous support obtained at the end of step b), or the catalyst precursor obtained at the end of step c), is impregnated with at least one solution containing at least one copper precursor and one nickel precursor at a desired copper concentration in order to obtain, on the final catalyst, a content of between 0.5% and 15% by weight of copper element relative to the total weight of the final catalyst.

The pH of said solution comprising at least one impregnated nickel precursor and one impregnated copper precursor can be modified by the optional addition of an acid or a base.

Preferably, said nickel precursor and the copper precursor are introduced in aqueous solution.

When the nickel precursor is introduced in aqueous solution, use is advantageously made of a nickel precursor in the nitrate, carbonate, acetate, chloride, hydroxide, hydroxycarbonate, oxalate, sulfate or formate form, in the form of complexes formed by a polyacid or an acid alcohol and its salts, in the form of complexes formed with acetylacetonates, in the form of tetrammine or hexammine complexes, or else in the form of any other inorganic derivative soluble in aqueous solution, which is brought into contact with said catalyst precursor. Preferably, nickel nitrate, nickel hydroxide, nickel carbonate, nickel chloride or nickel hydroxycarbonate is advantageously used as nickel precursor. Very preferably, the nickel precursor is nickel nitrate, nickel carbonate or nickel hydroxide.

When the copper precursor is introduced in aqueous solution, a copper precursor in mineral or organic form is advantageously used. In mineral form, the copper precursor can be chosen from copper acetate, copper acetylacetonate, copper nitrate, copper sulfate, copper chloride, copper bromide, copper iodide or copper fluoride. Very preferably, the copper precursor salt is copper nitrate.

Preferably, the nickel precursor is supplied in step d1) at a desired concentration in order to obtain on the final catalyst (i.e. obtained at the end of the reduction step e)) a nickel content in the nickel-copper alloy of between 0.5% and 15% by weight of nickel element relative to the total weight of the final catalyst, preferably between 1% and 12% by weight, and more preferentially between 1% and 10% by weight.

The amounts of the copper precursor(s) introduced into the solution according to step d1) are chosen such that the total copper content is between 0.5% and 15% by weight of copper element relative to the total weight of the final catalyst (i.e. obtained at the end of step e)), preferably between 0.5% and 12% by weight, preferably between 0.75% and 10% by weight, and even more preferentially between 1% and 9% by weight.

Step d2)

In one embodiment according to the invention, a step d2) of drying the catalyst precursor obtained at the end of step d1) is carried out. The drying step d2) is advantageously carried out at a temperature below 250° C., preferably between 15° C. and 180° C., more preferentially between 30° C. and 160° C., even more preferentially between 50° C. and 150° C., and even more preferentially between 70° C. and 140° C., for a period of typically between 0.5 hour to 12 hours, and even more preferably for a period of 0.5 hour to 5 hours. Longer periods of time are not ruled out but do not necessarily provide any improvement.

The drying step can be carried out by any technique known to those skilled in the art. It is advantageously carried out under an inert atmosphere or under an oxygen-containing atmosphere or under a mixture of inert gas and oxygen. It is advantageously performed at atmospheric pressure or at reduced pressure. Preferably, this step is carried out at atmospheric pressure and in the presence of air or nitrogen.

Sub-step d2) is not optional when step d) is carried out before step a) or after step c). When step d) is carried out after step c), then at the end of sub-step d2), the total or partial presence, or the absence, of the butanol solution in the catalyst has no effect on the activity and/or the selectivity of the catalyst in the context of the selective hydrogenation of polyunsaturated compounds or the hydrogenation of aromatic compounds.

Step d2')

In one embodiment according to the invention, a step d2') of calcining the dried catalyst precursor obtained at the end of step d2) is carried out at a temperature of between 250° C. and 600° C. The calcining step d2') can be carried out at a temperature of between 250° C. and 600° C., preferably between 350° C. and 550° C., for a period typically of between 0.5 hour and 24 hours, preferably for a period of 0.5 hour to 12 hours, and even more preferably for a period of 0.5 hour to 10 hours, preferably under an inert atmosphere or under an oxygen-containing atmosphere. Longer periods of time are not ruled out but do not necessarily provide any improvement.

Implementation of Steps c) and d)

The process for preparing the catalyst comprises several embodiments. They are notably distinguished by the order of introduction of the solution comprising the precursor of the nickel active phase, and of the solution based on nickel and copper for obtaining the NiCu alloy.

Step d) can be carried out either before step a), or between steps b) and c), or after step c) of the preparation process.

When step d) is carried out before step a), then sub-steps c2) and d2) are compulsory. Preferably, steps c2') and/or d2') are also carried out. In this case, the volume V2 of the solution comprising at least one precursor of the nickel active phase supplied in step c1) is preferably such that V2=TPV−V1.

When step d) is carried out between steps b) and c), then sub-step c2) is compulsory. When step d) is carried out after step c), then sub-step d2) is compulsory. For these two cases, preferably, the volume V2 of the solution comprising at least one precursor of the nickel active phase supplied in step c1) and the volume V3 of the solution based on nickel and copper supplied in step d1) are such that V2+V3=TPV−V1.

In one embodiment according to the invention, step d) is carried out before step a).

In another embodiment according to the invention, step d) is carried out after step c).

The presence of the nickel-copper alloy at least partially in reduced form makes it possible to use operating conditions for reducing the nickel active phase which are less severe than in the prior art and thus makes it possible to carry out the reduction step directly within the reactor in which it is desired to carry out the hydrogenation of unsaturated or aromatic compounds.

Furthermore, the presence of copper in the catalyst makes it possible to preserve good activity of the catalyst and a good service life of the catalyst when the latter is placed in contact with a hydrocarbon feedstock comprising sulfur. Indeed, compared to nickel, the copper present in the catalyst more easily captures the sulfur-containing compounds included in the feedstock, which limits the irreversible poisoning of the active sites.

Step e) Reduction by a Reducing Gas (Optional)

In one embodiment according to the invention, prior to the use of the catalyst in the catalytic reactor and the implementation of a hydrogenation process, a reducing treatment step e) is carried out in the presence of a reducing gas so as to obtain a catalyst comprising nickel at least partially in the metallic form. This step is advantageously carried out in situ, that is to say after charging of the catalyst to a hydrogenation reactor. This treatment makes it possible to activate said catalyst and to form metal particles, in particular of nickel in the zero-valent state. The in situ implementation of the catalyst reducing treatment makes it possible to dispense with an additional step of passivation of the catalyst with an oxygen-bearing compound or $CO_2$, which is necessarily the case when the catalyst is prepared by carrying out a reducing treatment ex situ, that is to say outside the reactor used for the hydrogenation of aromatic or polyaromatic compounds. In fact, when the reducing treatment is carried out ex situ, it is necessary to carry out a passivation step in order to preserve the metallic phase of the catalyst in the presence of air (during operations of transport and charging of the catalyst to the hydrogenation reactor), then to carry out a new step of reducing the catalyst.

The reducing gas is preferably hydrogen. The hydrogen may be used pure or as a mixture (for example a hydrogen/nitrogen, hydrogen/argon or hydrogen/methane mixture). In the case where the hydrogen is used as a mixture, any proportion may be envisaged.

According to one essential aspect of the preparation process according to the invention, said reducing treatment is carried out at a temperature above or equal to 150° C. and below 250° C., preferably between 160° C. and 230° C., and more preferentially between 170° C. and 220° C. The duration of the reducing treatment is between 5 minutes and less than 5 hours, preferably between 10 minutes and 4 hours, and even more preferentially between 10 minutes and 110 minutes.

The rise in temperature up to the desired reduction temperature is generally slow, for example set between 0.1 and 10° C./min, preferably between 0.3 and 7° C./min.

The hydrogen flow rate, expressed in l/hour/gram of catalyst precursor, is between 0.01 and 100 l/hour/gram of catalyst precursor, preferably between 0.05 and 10 l/hour/gram of catalyst precursor and more preferably still between 0.1 and 5 l/hour/gram of catalyst precursor.

Step f) Passivation (Optional)

The catalyst prepared according to the process according to the invention can advantageously undergo a step of passivation by a sulfur-containing compound which makes it possible to improve the selectivity of the catalysts and to prevent thermal runaways during the start-up of fresh catalysts. The passivation generally consists in irreversibly poisoning, by the sulfur-containing compound, the most virulent active sites of the nickel which exist on the fresh catalyst and in thus weakening the activity of the catalyst in favor of its selectivity. The passivation step is carried out by the use of methods known to those skilled in the art.

The step of passivation by a sulfur-containing compound is generally carried out at a temperature of between 20° C. and 350° C., preferably between 40° C. and 200° C., for from 10 minutes to 240 minutes. The sulfur-containing compound is, for example, chosen from the following compounds: thiophene, thiophane, alkyl monosulfides, such as dimethyl sulfide, diethyl sulfide, dipropyl sulfide and propyl methyl sulfide, or also an organic disulfide of formula HO—$R_1$—S—S—$R_2$—OH, such as dithiodiethanol of formula HO—$C_2H_4$—S—S—$C_2H_4$—OH (often referred to as DEODS). The sulfur content is generally between 0.1% and 2% by weight of said element, relative to the total weight of the catalyst.

In one embodiment according to the invention, the preparation of the catalyst is carried out ex situ, that is to say before loading the catalyst into the reaction unit of the process for selective hydrogenation or hydrogenation of aromatics.

3. Catalyst

The preparation process according to the invention makes it possible to obtain a catalyst comprising nickel and copper, in a proportion of 1% to 50% by weight of nickel element relative to the total weight of the catalyst, and in a proportion of 0.5% to 15% by weight of copper element relative to the total weight of the catalyst, and a porous alumina support, the nickel being distributed both over a crust at the periphery of the support, and at the core of the support, the thickness of said crust being between 2% and 15% of the diameter of the catalyst, and the size of the nickel particles in the catalyst, measured in oxide form, being between 7 nm and 25 nm.

Preferably, the nickel is distributed both on a crust at the periphery of the support, and in the core of the support, the crust thickness ep1 being between 2.5% and 12% of the diameter of the catalyst, even more preferably between 3% and 10% of the diameter of the catalyst and even more preferably between 3% and 7.5% of the diameter of the catalyst.

Preferably, the nickel density ratio between the crust and the core (also referred to here as $d_{crust}/d_{core}$) is strictly greater than 3, preferably greater than 3.5 and preferably between 3.8 and 15.

Preferably, said crust comprises more than 25% by weight of nickel element relative to the total weight of nickel contained in the catalyst, preferably more than 40% by weight, more preferentially between 45% and 90% by weight, and even more preferentially between 60% and 90% by weight.

Preferably, the mole ratio between the nickel and the copper is between 0.5 mol/mol and 5 mol/mol, preferably between 0.7 mol/mol and 4.5 mol/mol, more preferentially between 0.9 mol/mol and 4 mol/mol.

Preferably, at least one portion of the nickel and the copper is in the form of a nickel-copper alloy, advantageously corresponding to the formula $Ni_xCu_y$, with x between 0.1 and 0.9 and y between 0.1 and 0.9.

Preferably, the nickel content included in the copper-nickel alloy is between 0.5% and 15% by weight of nickel element relative to the total weight of the catalyst, preferably between 1% and 12% by weight, and more preferentially between 1% and 10% by weight.

Preferably, the size of the nickel particles, measured in oxide form, in the catalyst is between 7 nm and 25 nm, preferably between 8 nm and 23 nm.

Advantageously, the transition interval between the core and the crust of the catalyst (also referred to here as the core/crust transition interval, or ep2-ep1 according to the notations in FIG. 1), linked to the variation in the nickel density measured over the thickness of the catalyst from the edge of the catalyst to the center of the catalyst, is very abrupt. Preferably, the core/crust transition interval is between 0.05% and 3% of the diameter of the catalyst, preferably between 0.5% and 2.5% of the diameter of the catalyst.

The nickel content in said catalyst is advantageously between 1% and 50% by weight relative to the total weight of the catalyst, more preferentially between 2% and 40% by weight and even more preferentially between 3% and 35% by weight and even more preferentially 5% and 25% by weight relative to the total weight of the catalyst.

The copper content is between 0.5% and 15% by weight of copper element relative to the total weight of the catalyst, preferably between 0.5% and 12% by weight, preferably between 0.75% and 10% by weight, and even more preferentially between 1% and 9% by weight.

The catalyst can be described as a "semi eggshell" catalyst in which the concentration of nickel is higher at the periphery of the support than in the core of the support, said concentration of nickel in the core of the support being non-zero.

The specific surface area of the catalyst is generally between 10 $m^2/g$ and 350 $m^2/g$, preferably between 25 $m^2/g$ and 300 $m^2/g$, more preferably between 40 $m^2/g$ and 250 $m^2/g$.

The total pore volume of the catalyst is generally between 0.1 ml/g and 1 ml/g, preferably between 0.2 ml/g and 0.8 ml/g, and particularly preferably between 0.3 ml/g and 0.7 ml/g.

Preferably, the active phase of the catalyst does not comprise a metal from group VIB. In particular, it does not comprise molybdenum or tungsten.

Said catalyst (and the support used for the preparation of the catalyst) is in the form of grains advantageously having a diameter of between 0.5 mm and 10 mm. The grains may have any form known to those skilled in the art, for example the form of beads (preferably having a diameter of between 1 mm and 8 mm), of extrudates, of tablets or of hollow cylinders. Preferably, the catalyst (and the support used for the preparation of the catalyst) are in the form of extrudates with a diameter of between 0.5 mm and 10 mm, preferably between 0.8 mm and 3.2 mm and very preferably between 1.0 mm and 2.5 mm and with a length of between 0.5 mm and 20 mm. The "diameter" of the extrudates is intended to mean the diameter of the circle circumscribed in the cross section of these extrudates. The catalyst can advantageously be presented in the form of cylindrical, multilobate, trilobate or quadrilobate extrudates. Preferably its shape is trilobate or quadrilobate. The shape of the lobes can be adjusted according to all the known methods of the prior art.

4. Support

The characteristics of the alumina, mentioned in this section, correspond to the characteristics of the alumina before carrying out step a) of the preparation process according to the invention. The support is an alumina, that is to say that the support comprises at least 95%, preferably at least 98% and particularly preferably at least 99% by weight of alumina, relative to the weight of the support. The alumina generally exhibits a crystallographic structure of the δ-, γ- or θ-alumina type, alone or as a mixture.

The alumina support may comprise impurities such as oxides of metals from groups IIA, IIIB, IVB, IIB, IIIA and IVA according to the CAS classification, preferably silica, titanium dioxide, zirconium dioxide, zinc oxide, magnesium oxide and calcium oxide, or else alkali metals, preferably lithium, sodium or potassium, and/or alkaline earth metals, preferably magnesium, calcium, strontium or barium, or else sulfur.

The specific surface area of the alumina is generally between 10 $m^2/g$ and 400 $m^2/g$, preferably between 30 $m^2/g$ and 350 $m^2/g$, more preferably between 50 $m^2/g$ and 300 $m^2/g$.

The total pore volume of the alumina is generally between 0.1 ml/g and 1.2 ml/g, preferably between 0.3 ml/g and 0.9 ml/g, and very preferably between 0.5 ml/g and 0.9 ml/g.

5. Selective Hydrogenation Process

Another subject of the present invention is a process for the selective hydrogenation of polyunsaturated compounds containing at least 2 carbon atoms per molecule, such as diolefins and/or acetylenics and/or alkenylaromatics, also known as styrenics, contained in a hydrocarbon feedstock having a final boiling point below or equal to 300° C., said process being carried out at a temperature of between 0° C. and 300° C., at a pressure of between 0.1 MPa and 10 MPa, at a hydrogen/(polyunsaturated compounds to be hydrogenated) mole ratio of between 0.1 and 10 and at an hourly space velocity of between 0.1 $h^{-1}$ and 200 $h^{-1}$ when the process is carried out in the liquid phase, or at a hydrogen/(polyunsaturated compounds to be hydrogenated) mole ratio of between 0.5 and 1000 and at an hourly space velocity of between 100 $h^{-1}$ and 40 000 $h^{-1}$ when the process is carried out in the gas phase, in the presence of a catalyst obtained by the preparation process as described above in the description.

Monounsaturated organic compounds, such as, for example, ethylene and propylene, are at the root of the manufacture of polymers, of plastics and of other chemicals having added value. These compounds are obtained from natural gas, from naphtha or from gas oil which have been treated by steam cracking or catalytic cracking processes. These processes are carried out at high temperature and produce, in addition to the desired monounsaturated compounds, polyunsaturated organic compounds, such as acetylene, propadiene and methylacetylene (or propyne), 1,2-butadiene and 1,3-butadiene, vinylacetylene and ethylacetylene, and other polyunsaturated compounds, the boiling point of which corresponds to the C5+ fraction (hydrocarbon compounds having at least 5 carbon atoms), in particular diolefinic or styrene or indene compounds. These polyunsaturated compounds are highly reactive and result in side reactions in the polymerization units. It is thus necessary to remove them before making economic use of these fractions.

Selective hydrogenation is the main treatment developed to specifically remove undesirable polyunsaturated compounds from these hydrocarbon feedstocks. It enables the conversion of polyunsaturated compounds to the corresponding alkenes or aromatics while avoiding the complete saturation thereof and thus the formation of the corresponding alkanes or naphthenes. In the case of steam cracking gasolines used as feedstock, the selective hydrogenation also makes it possible to selectively hydrogenate the alkenylaromatics to give aromatics while avoiding the hydrogenation of the aromatic rings.

The hydrocarbon feedstock treated in the selective hydrogenation process has a final boiling point of below or equal to 300° C. and contains at least 2 carbon atoms per molecule and comprises at least one polyunsaturated compound. The term "polyunsaturated compounds" is intended to mean compounds comprising at least one acetylenic function and/or at least one diene function and/or at least one alkenylaromatic function.

More particularly, the feedstock is chosen from the group consisting of a steam cracking C2 fraction, a steam cracking C2-C3 fraction, a steam cracking C3 fraction, a steam cracking C4 fraction, a steam cracking C5 fraction and a steam cracking gasoline, also known as pyrolysis gasoline or C5+ fraction.

The steam cracking C2 fraction, advantageously used for the implementation of the selective hydrogenation process according to the invention, exhibits, for example, the following composition: between 40% and 95% by weight of ethylene and of the order of 0.1% to 5% by weight of acetylene, the remainder being essentially ethane and methane. In some steam cracking C2 fractions, between 0.1% and 1% by weight of C3 compounds may also be present.

The steam cracking C3 fraction, advantageously used for the implementation of the selective hydrogenation process according to the invention, exhibits, for example, the following mean composition: of the order of 90% by weight of propylene and of the order of 1% to 8% by weight of propadiene and of methylacetylene, the remainder being essentially propane. In some C3 fractions, between 0.1% and 2% by weight of C2 compounds and of C4 compounds may also be present.

A C2-C3 fraction can also advantageously be used for the implementation of the selective hydrogenation process according to the invention. It exhibits, for example, the following composition: of the order of 0.1% to 5% by weight of acetylene, of the order of 0.1% to 3% by weight of propadiene and of methylacetylene, of the order of 30% by weight of ethylene and of the order of 5% by weight of propylene, the remainder being essentially methane, ethane and propane. This feedstock may also contain between 0.1% and 2% by weight of C4 compounds.

The steam cracking C4 fraction, advantageously used for the implementation of the selective hydrogenation process according to the invention, exhibits, for example, the following mean composition by weight: 1% by weight of butane, 46.5% by weight of butene, 51% by weight of butadiene, 1.3% by weight of vinylacetylene and 0.2% by weight of butyne. In some C4 fractions, between 0.1% and 2% by weight of C3 compounds and of C5 compounds may also be present.

The steam cracking C5 fraction, advantageously used for the implementation of the selective hydrogenation process according to the invention, exhibits, for example, the following composition: 21% by weight of pentanes, 45% by weight of pentenes and 34% by weight of pentadienes.

The steam cracking gasoline or pyrolysis gasoline, advantageously used for the implementation of the selective hydrogenation process according to the invention, corresponds to a hydrocarbon fraction, the boiling point of which is generally between 0° C. and 300° C., preferably between 10° C. and 250° C. The polyunsaturated hydrocarbons to be hydrogenated present in said steam cracking gasoline are in particular diolefin compounds (butadiene, isoprene, cyclopentadiene, and the like), styrene compounds (styrene, α-methylstyrene, and the like) and indene compounds (indene, and the like). The steam cracking gasoline generally comprises the C5-C12 fraction with traces of C3, C4, C13, C14 and C15 (for example between 0.1% and 3% by weight for each of these fractions). For example, a feedstock formed of pyrolysis gasoline generally has a composition as follows: 5% to 30% by weight of saturated compounds (paraffins and naphthenes), 40% to 80% by weight of aromatic compounds, 5% to 20% by weight of mono-olefins, 5% to 40% by weight of diolefins and 1% to 20% by weight of alkenylaromatic compounds, the combined compounds forming 100%. It also contains from 0 to 1000 ppm by weight of sulfur, preferably from 0 to 500 ppm by weight of sulfur.

Preferably, the polyunsaturated hydrocarbon feedstock treated in accordance with the selective hydrogenation process according to the invention is a steam cracking C2 fraction or a steam cracking C2-C3 fraction or a steam cracking gasoline.

The selective hydrogenation process according to the invention is targeted at removing said polyunsaturated hydrocarbons present in said feedstock to be hydrogenated without hydrogenating the monounsaturated hydrocarbons. For example, when said feedstock is a C2 fraction, the selective hydrogenation process is targeted at selectively hydrogenating acetylene. When said feedstock is a C3 fraction, the selective hydrogenation process is targeted at selectively hydrogenating propadiene and methylacetylene.

In the case of a C4 fraction, the aim is to remove butadiene, vinylacetylene (VAC) and butyne; in the case of a C5 fraction, the aim is to remove the pentadienes. When said feedstock is a steam cracking gasoline, the selective hydrogenation process is targeted at selectively hydrogenating said polyunsaturated hydrocarbons present in said feedstock to be treated so that the diolefin compounds are partially hydrogenated to give mono-olefins and so that the styrene and indene compounds are partially hydrogenated to give corresponding aromatic compounds while avoiding the hydrogenation of the aromatic rings.

The technological implementation of the selective hydrogenation process is, for example, carried out by injection, as upflow or downflow, of the polyunsaturated hydrocarbon feedstock and of the hydrogen into at least one fixed bed reactor. Said reactor can be of isothermal type or of adiabatic type. An adiabatic reactor is preferred. The polyunsaturated hydrocarbon feedstock can advantageously be diluted by one or more reinjection(s) of the effluent, resulting from said reactor where the selective hydrogenation reaction takes place, at various points of the reactor, located between the inlet and the outlet of the reactor, in order to limit the temperature gradient in the reactor. The technological implementation of the selective hydrogenation process according to the invention can also advantageously be carried out by the implantation of at least said supported catalyst in a reactive distillation column or in reactors-exchangers or in a slurry-type reactor. The stream of hydrogen can be introduced at the same time as the feedstock to be hydrogenated and/or at one or more different points of the reactor.

The selective hydrogenation of the steam cracking C2, C2-C3, C3, C4, C5 and C5+ fractions can be carried out in the gas phase or in the liquid phase, preferably in the liquid phase for the C3, C4, C5 and C5+ fractions and in the gas phase for the C2 and C2-C3 fractions. A liquid-phase reaction makes it possible to lower the energy cost and to increase the cycle period of the catalyst.

In general, the selective hydrogenation of a hydrocarbon feedstock containing polyunsaturated compounds containing at least 2 carbon atoms per molecule and having a final boiling point below or equal to 300° C. is carried out at a temperature of between 0° C. and 300° C., at a pressure of between 0.1 MPa and 10 MPa, at a hydrogen/(polyunsaturated compounds to be hydrogenated) mole ratio of between 0.1 and 10 and at an hourly space velocity (defined as the ratio of the volume flow rate of feedstock to the volume of catalyst) of between 0.1 $h^{-1}$ and 200 $h^{-1}$ for a process carried out in the liquid phase, or at a hydrogen/(polyunsaturated compounds to be hydrogenated) mole ratio of between 0.5 and 1000 and at an hourly space velocity of between 100 $h^{-1}$ and 40 000 $h^{-1}$ for a process carried out in the gas phase.

In one embodiment according to the invention, when a selective hydrogenation process is carried out wherein the feedstock is a steam cracking gasoline comprising polyunsaturated compounds, the (hydrogen)/(polyunsaturated compounds to be hydrogenated) mole ratio is generally between 0.5 and 10, preferably between 0.7 and 5.0 and more preferably still between 1.0 and 2.0, the temperature is between 0° C. and 200° C., preferably between 20° C. and 200° C. and more preferably still between 30° C. and 180° C., the hourly space velocity (HSV) is generally between 0.5 $h^{-1}$ and 100 $h^{-1}$, preferably between 1 $h^{-1}$ and 50 $h^{-1}$, and the pressure is generally between 0.3 MPa and 8.0 MPa, preferably between 1.0 MPa and 7.0 MPa and more preferably still between 1.5 MPa and 4.0 MPa.

More preferentially, a selective hydrogenation process is carried out wherein the feedstock is a steam cracking gasoline comprising polyunsaturated compounds, the hydrogen/(polyunsaturated compounds to be hydrogenated) mole ratio is between 0.7 and 5.0, the temperature is between 20° C. and 200° C., the hourly space velocity (HSV) is generally between 1 $h^{-1}$ and 50 $h^{-1}$ and the pressure is between 1.0 MPa and 7.0 MPa.

More preferentially still, a selective hydrogenation process is carried out wherein the feedstock is a steam cracking gasoline comprising polyunsaturated compounds, the hydrogen/(polyunsaturated compounds to be hydrogenated) mole ratio is between 1.0 and 2.0, the temperature is between 30° C. and 180° C., the hourly space velocity (HSV) is generally between 1 $h^{-1}$ and 50 $h^{-1}$ and the pressure is between 1.5 MPa and 4.0 MPa.

The hydrogen flow rate is adjusted in order to have available a sufficient amount thereof to theoretically hydrogenate all of the polyunsaturated compounds and to maintain an excess of hydrogen at the reactor outlet.

In another embodiment according to the invention, when a selective hydrogenation process is carried out wherein the feedstock is a steam cracking C2 fraction and/or a steam cracking C2-C3 fraction comprising polyunsaturated compounds, the (hydrogen)/(polyunsaturated compounds to be hydrogenated) mole ratio is generally between 0.5 and 1000, preferably between 0.7 and 800, the temperature is between 0° C. and 300° C., preferably between 15° C. and 280° C., the hourly space velocity (HSV) is generally between 100 $h^{-1}$ and 40 000 $h^{-1}$, preferably between 500 $h^{-1}$ and 30 000 $h^{-1}$, and the pressure is generally between 0.1 MPa and 6.0 MPa, preferably between 0.2 MPa and 5.0 MPa.

6. Process for the Hydrogenation of Aromatics

Another subject of the present invention is a process for the hydrogenation of at least one aromatic or polyaromatic compound contained in a hydrocarbon feedstock having a final boiling point below or equal to 650° C., generally between 20° C. and 650° C., and preferably between 20° C. and 450° C. Said hydrocarbon feedstock containing at least one aromatic or polyaromatic compound can be chosen from the following petroleum or petrochemical fractions: the reformate from catalytic reforming, kerosene, light gas oil, heavy gas oil, cracking distillates, such as FCC recycle oil, coking unit gas oil or hydrocracking distillates.

The content of aromatic or polyaromatic compounds contained in the hydrocarbon feedstock treated in the hydrogenation process according to the invention is generally between 0.1% and 80% by weight, preferably between 1% and 50% by weight and particularly preferably between 2% and 35% by weight, the percentage being based on the total weight of the hydrocarbon feedstock. The aromatic compounds present in said hydrocarbon feedstock are, for example, benzene or alkylaromatics, such as toluene, ethylbenzene, o-xylene, m-xylene or p-xylene, or also aromatics having several aromatic rings (polyaromatics), such as naphthalene.

The sulfur or chlorine content of the feedstock is generally less than 5000 ppm by weight of sulfur or chlorine, preferably less than 100 ppm by weight and particularly preferably less than 10 ppm by weight.

The technological implementation of the process for the hydrogenation of aromatic or polyaromatic compounds is, for example, carried out by injection, as upflow or downflow, of the hydrocarbon feedstock and of the hydrogen into at least one fixed bed reactor. Said reactor can be of isothermal type or of adiabatic type. An adiabatic reactor is preferred. The hydrocarbon feedstock can advantageously be diluted by one or more reinjection(s) of the effluent, resulting from said reactor where the reaction for the hydrogenation of the aromatics takes place, at various points of the reactor, located between the inlet and the outlet of the reactor, in order to limit the temperature gradient in the reactor. The technological implementation of the process for the hydrogenation of the aromatics according to the invention may also advantageously be carried out by the implantation of at least said supported catalyst in a reactive distillation column or in reactors-exchangers or in a slurry-type reactor. The stream of hydrogen can be introduced at the same time as the feedstock to be hydrogenated and/or at one or more different points of the reactor.

The hydrogenation of the aromatic or polyaromatic compounds can be carried out in the gas phase or in the liquid phase, preferably in the liquid phase. Generally, the hydrogenation of the aromatic or polyaromatic compounds is carried out at a temperature of between 30° C. and 350° C., preferably between 50° C. and 325° C., at a pressure of between 0.1 MPa and 20 MPa, preferably between 0.5 MPa and 10 MPa, at a hydrogen/(aromatic compounds to be hydrogenated) mole ratio of between 0.1 and 10 and at an hourly space velocity of between 0.05 $h^{-1}$ and 50 $h^{-1}$, preferably between 0.1 $h^{-1}$ and 10 $h^{-1}$, of a hydrocarbon feedstock containing aromatic or polyaromatic compounds and having a final boiling point below or equal to 650° C., generally between 20° C. and 650° C., and preferably between 20° C. and 450° C.

The hydrogen flow rate is adjusted in order to have available a sufficient amount thereof to theoretically hydrogenate all of the aromatic compounds and to maintain an excess of hydrogen at the reactor outlet.

The conversion of the aromatic or polyaromatic compounds is generally greater than 20 mol %, preferably greater than 40 mol %, more preferably greater than 80 mol % and particularly preferably greater than 90 mol % of the aromatic or polyaromatic compounds contained in the hydrocarbon feedstock. The conversion is calculated by dividing the difference between the total moles of the aromatic or polyaromatic compounds in the hydrocarbon feedstock and in the product by the total moles of the aromatic or polyaromatic compounds in the hydrocarbon feedstock.

According to a specific alternative form of the process according to the invention, a process for the hydrogenation of the benzene of a hydrocarbon feedstock, such as the reformate resulting from a catalytic reforming unit, is carried out. The benzene content in said hydrocarbon feedstock is generally between 0.1% and 40% by weight, preferably between 0.5% and 35% by weight and particularly preferably between 2% and 30% by weight, the percentage by weight being based on the total weight of the hydrocarbon feedstock.

The sulfur or chlorine content of the feedstock is generally less than 10 ppm by weight of sulfur or chlorine respectively and preferably less than 2 ppm by weight.

The hydrogenation of the benzene contained in the hydrocarbon feedstock can be carried out in the gas phase or in the liquid phase, preferably in the liquid phase. When it is carried out in the liquid phase, a solvent can be present, such as cyclohexane, heptane or octane. Generally, the hydrogenation of the benzene is carried out at a temperature of between 30° C. and 250° C., preferably between 50° C. and 200° C. and more preferably between 80° C. and 180° C., at a pressure of between 0.1 MPa and 10 MPa, preferably between 0.5 MPa and 4 MPa, at a hydrogen/(benzene) mole ratio of between 0.1 and 10 and at an hourly space velocity of between 0.05 $h^{-1}$ and 50 $h^{-1}$, preferably between 0.5 $h^{-1}$ and 10 $h^{-1}$.

The conversion of the benzene is generally greater than 50 mol %, preferably greater than 80 mol %, more preferably greater than 90 mol % and particularly preferably greater than 98 mol %.

The invention is illustrated via the examples below which are in no way limiting.

EXAMPLES

For all the catalysts mentioned in the examples below, the support is an alumina A having a specific surface area of 80 $m^2/g$, a pore volume of 0.7 ml/g and a median mesopore diameter of 12 nm.

Example 1: Preparation of an Aqueous Solution of Ni Precursors

The aqueous solution of Ni precursors (solution S1) used for the preparation of catalysts A to H is prepared by dissolving 43.5 g of nickel nitrate ($NiNO_3$, supplier Strem Chemicals®) in a volume of 13 ml of distilled water. The solution S1, the Ni concentration of which is 350 g of Ni per liter of solution, is obtained.

Example 2: Preparation of an Aqueous Solution of the Precursors of the NiCu Alloy (5% Ni)

The aqueous solution of precursors of the NiCu alloy (solution S2) used for the preparation of the catalysts containing NiCu is prepared by dissolving 14.5 g of nickel nitrate ($NiNO_3$, supplier Strem Chemicals®) in a volume of 13 ml of distilled water. A solution, the Ni concentration of which is 116.6 g of Ni per liter of solution, is obtained. The copper nitrate precursor is then added in order to have an Ni/Cu mole ratio of 1.

The solution S2 is obtained. It makes it possible to introduce the precursors of the NiCu alloy with a weight content of Ni relative to the final catalyst of 5% by weight relative to the total weight of the catalyst.

Example 3: Preparation of a Catalyst A According to the Invention [10 wt % of Ni+NiCu—ButOH 25% TPV in Pre-Impregnation]

10 g of alumina are impregnated with 2.4 ml of butanol added dropwise. The impregnated support is then left to mature for 30 min at 60° C. Next 7.1 ml of solution S1 is dry impregnated, by adding it dropwise, on the matured impregnated support obtained above. The catalyst precursor obtained is subsequently dried in an oven for 12 hours at 120° C. Next 10 ml of solution S2 prepared in example 2 is dry impregnated by adding it dropwise. The solid thus obtained is subsequently dried in an oven at 120° C. for 12 hours and then calcined under a stream of dry air of 1 l/h/g of catalyst at 450° C. for 2 hours.

Catalyst A containing 15% by weight of the nickel element relative to the total weight of the catalyst (including 5% by weight of nickel element in the NiCu alloy) is obtained. The characteristics of catalyst A thus obtained are given in table 1 below.

Example 4: Preparation of a Catalyst B According to the Invention [5 wt % of Ni+NiCu—ButOH 25% TPV in Pre-Impregnation]

10 g of alumina are impregnated with 2.4 ml of butanol added dropwise. The impregnated support is then left to mature for 30 min at 60° C. 7.1 ml of solution S1 two-fold diluted (3.55 ml of solution S1 diluted with water to obtain 7.1 ml of final solution, half as concentrated as for example 3) is dry impregnated, by adding it dropwise, on the matured impregnated support obtained above. The catalyst precursor thus obtained is subsequently dried in an oven for 12 hours at 120° C. Next 10 ml of solution S2 prepared in example 2 is dry impregnated by adding it dropwise. The solid thus obtained is subsequently dried in an oven at 120° C. for 12 hours and then calcined under a stream of dry air of 1 l/h/g of catalyst at 450° C. for 2 hours.

Catalyst B containing 10% by weight of the nickel element relative to the total weight of the catalyst (including 5% by weight of nickel element in the NiCu alloy) is obtained. The characteristics of catalyst B thus obtained are given in table 1 below.

Example 5: Preparation of a Catalyst C According to the Invention [10 wt % of Ni+NiCu—ButOH 75% TPV in Pre-Impregnation]

10 g of alumina are impregnated with 7.2 ml of butanol added dropwise. The impregnated support is then left to mature for 30 min at 60° C. Next 2.4 ml of solution S1 is impregnated, by adding it dropwise, on the matured impregnated support obtained above. The catalyst precursor thus obtained is subsequently dried in an oven for 12 hours at 120° C. Next 10 ml of solution S2 prepared in example 2 is dry impregnated by adding it dropwise. The solid thus obtained is subsequently dried in an oven at 120° C. for 12 hours and then calcined under a stream of dry air of 1 l/h/g of catalyst at 450° C. for 2 hours.

Catalyst C containing 15% by weight of the nickel element relative to the total weight of the catalyst (including 5% by weight of nickel element in the NiCu alloy) is obtained. The characteristics of catalyst C thus obtained are given in table 1 below.

Example 6: Preparation of a Catalyst D not in Accordance with the Invention [Conventional Catalyst with NiCu, 10 wt % Ni]

10 ml of solution S1 is dry impregnated, by adding it dropwise, on the alumina support A. The impregnated support thus obtained is subsequently dried in an oven for 12 hours at 120° C. Next 10 ml of solution S2 prepared in example 2 is dry impregnated by adding it dropwise. The solid thus obtained is subsequently dried in an oven at 120° C. for 12 hours and then calcined under a stream of dry air of 1 l/h/g of catalyst at 450° C. for 2 hours.

Catalyst D containing 15% by weight of the nickel element relative to the total weight of the catalyst (including 5% by weight of nickel element in the NiCu alloy) is obtained. The characteristics of catalyst D thus obtained are given in table 1 below.

Example 7: Preparation of a Catalyst E not in Accordance with the Invention [ButOH Pre-Impregnation in Eggshell, 10 wt % Ni]

10 g of alumina are impregnated with 2.4 ml of butanol added dropwise. The impregnated support is then left to mature for 30 min at 60° C. 7.1 ml of solution S1 prepared in example 1 is dry impregnated, by adding it dropwise, on the matured impregnated support obtained above.

The catalyst precursor thus obtained is subsequently dried in an oven at 120° C. for 12 hours and then calcined under a stream of dry air of 1 l/h/g of catalyst at 450° C. for 2 hours.

Catalyst E containing 10% by weight of the nickel element relative to the total weight of the catalyst is obtained. The characteristics of catalyst E thus obtained are given in table 1 below.

Example 8: Preparation of a Catalyst F not in Accordance with the Invention [10 wt % of Ni—ButOH 25% TPV in Post-Impregnation+NiCu]

7.1 ml of solution S1 is dry impregnated, by adding it dropwise, on the alumina support A. The catalyst precursor thus obtained is subsequently dried in an oven for 12 hours at 120° C. Next 10 ml of solution S2 prepared in example 2 is dry impregnated, by adding it dropwise, on the catalyst precursor obtained above.

The solid thus obtained is subsequently dried in an oven for 12 hours at 120° C. and then calcined under a stream of dry air of 1 l/h/g of catalyst at 450° C. for 2 hours. 2.4 ml of butanol are then impregnated. The solid is then left to mature for 30 min at 60° C. The solid thus obtained is subsequently dried in an oven for 12 hours at 120° C. and then calcined under a stream of dry air of 1 l/h/g of catalyst at 450° C. for 2 hours.

Catalyst F containing 15% by weight of the nickel element relative to the total weight of the catalyst (including 5% by weight of nickel element in the NiCu alloy) is obtained. The characteristics of catalyst F thus obtained are given in table 1 below.

Example 9: Preparation of a Catalyst G not in Accordance with the Invention [10 wt % of Ni-Toluene 25% TPV in Pre-Impregnation, NiCu]

10 g of alumina are impregnated with 2.4 ml of toluene added dropwise. The impregnated support is then left to mature for 30 min at 60° C. Next 7.1 ml of solution S1 is dry impregnated, by adding it dropwise, on the matured impregnated support obtained above. The catalyst precursor thus obtained is subsequently dried in an oven for 12 hours at 120° C. Next 10 ml of solution S2 prepared in example 2 is dry impregnated by adding it dropwise. The solid thus obtained is subsequently dried in an oven at 120° C. for 12 hours and then calcined under a stream of dry air of 1 l/h/g of catalyst at 450° C. for 2 hours.

Catalyst G containing 15% by weight of the nickel element relative to the total weight of the catalyst (including 5% by weight of nickel element in the NiCu alloy) is obtained. The characteristics of catalyst G thus obtained are given in table 1 below.

Example 10: Preparation of a Catalyst H not in Accordance with the Invention [10 wt % of Ni-n-Propanol 25% TPV in Pre-Impregnation, NiCu]

10 g of alumina A are impregnated with 2.4 ml of n-propanol added dropwise. The impregnated support is then left to mature for 30 min at 60° C. Next 7.1 ml of solution S1 is dry impregnated, by adding it dropwise, on the matured impregnated support obtained above. The catalyst precursor thus obtained is subsequently dried in an oven for 12 hours at 120° C. Next 10 ml of solution S2 prepared in example 2 is dry impregnated by adding it dropwise. The solid thus obtained is subsequently dried in an oven at 120° C. for 12 hours and then calcined under a stream of dry air of 1 l/h/g of catalyst at 450° C. for 2 hours.

Catalyst H containing 15% by weight of the nickel element relative to the total weight of the catalyst (including 5% by weight of nickel element in the NiCu alloy) is obtained. The characteristics of catalyst H thus obtained are given in table 1 below.

Example 11: Characterization

The amount of alloy obtained after the calcining step then reduction step was determined by X-ray diffraction (XRD) analysis on samples of the catalyst in powder form.

degree of reducibility and therefore the formation of $Ni^0$, the area of the line of $Ni^0$ located around 52° 2θ is measured, on all the diffractograms, by subtracting the signal present as soon as ambient temperature is reached under the line at 52°, which is due to the alumina. It is thus possible to determine the relative percentage of $Ni^0$ crystallized after reduction.

Table 2 below summarizes the degrees of reducibility or the $Ni^0$ content for all the catalysts characterized by XRD after reduction at 170° C. for 90 minutes under a hydrogen stream. These values were also compared with the degree of reduction obtained for catalyst E (Ni alone) after a conventional reduction step (that is to say at a temperature of 400° C. for 15 hours under a hydrogen stream).

TABLE 1

| Catalyst | Solvent (% by volume relative to the TPV of the support) | Ni (wt %) | Particle size (nm) | Crust thickness/grain diameter (%) | $d_{crust}/d_{core}$ | Ni content in crust/total Ni (%) |
|---|---|---|---|---|---|---|
| A (in accordance) | 25% BuTOH in pre-impregnation | 15 | 11.5 | 6.8 | 5 | 66 |
| B (in accordance) | 25% BuTOH in pre-impregnation | 10 | 7 | 3.8 | 12 | 71 |
| C (in accordance) | 75% BuTOH in pre-impregnation | 15 | 12 | 4.7 | 10 | 70 |
| D (not in accordance) | — | 15 | 12 | Homogeneous distribution | — | — |
| E (not in accordance) | 25% BuTOH in pre-impregnation | 10 | 12 | 6.8 | 5 | 66 |
| F (not in accordance) | 25% BuTOH in post-impregnation | 15 | 12 | Homogeneous distribution | — | — |
| G (not in accordance) | 25% toluene in pre-impregnation | 15 | 11.5 | Homogeneous distribution | — | — |
| H (not in accordance) | 25% n-propanol in pre-impregnation | 15 | 11.5 | Homogeneous distribution | — | — |

The amount of nickel in metallic form obtained after the reduction step was determined by X-ray diffraction (XRD) analysis on samples of catalyst in powder form. Between the reduction step and throughout the duration of the characterization by XRD, the catalysts are never returned to the open air. The diffraction patterns are obtained by radiocrystallographic analysis by means of a diffractometer using the conventional powder method with copper Kα1 radiation (λ=1.5406 Å).

The degree of reduction was calculated by calculating the area of the line of $Ni^0$ located around 52°2θ, on all of the diffractograms of each sample of catalyst analyzed, then by subtracting the signal present as soon as ambient temperature is reached under the line at 52°, which is due to alumina.

Table 2 below collates the degrees of reduction or else the content of nickel metal $Ni^0$ (expressed as % by weight relative to the total weight of "active" Ni which does not form the alloy) for all the catalysts A to H characterized by XRD after a reduction step at 170° C. for 90 minutes under a hydrogen stream. These values were also compared with the degree of reduction obtained for catalyst E (Ni alone) after a conventional reduction step (that is to say at a temperature of 400° C. for 15 hours under a hydrogen stream).

Alumina in delta and theta form and large CuO and NiO lines are detected at ambient temperature on all the copper- and nickel-containing catalysts, after calcination.

A line corresponding to the alloy in $Ni_{0.76}Cu_{0.24}$ form is moreover detected after reduction. In order to evaluate the

TABLE 2

| Catalyst | Final reduction | Ni/Cu | Particle size (nm) | Percentage of $Ni^0$ alone (XRD) after reduction (%) |
|---|---|---|---|---|
| A (in accordance) | 170° C., 90 min | yes | 11.5 | 90 |
| B (in accordance) | 170° C., 90 min | yes | 7 | 92 |
| C (in accordance) | 170° C., 90 min | yes | 12 | 90 |
| D (not in accordance) | 170° C., 90 min | yes | 12 | 90 |
| E (not in accordance) | 170° C., 90 min | no | 12 | 0* |
| E (not in accordance) | 400° C., 15 h | no | 12 | 80 |
| F (not in accordance) | 170° C., 90 min | yes | 12 | 90 |
| G (not in accordance) | 170° C., 90 min | yes | 12 | 95 |
| H (not in accordance) | 170° C., 90 min | yes | 12 | 95 |

*Nickel in NiO form

For catalyst E (10% Ni alone/alumina), the degree of reducibility of nickel is 0% after exactly the same reduction treatment under hydrogen as for catalysts A, B, C, D, F, G and H. It is necessary to reduce catalyst E at 400° C. in order to have a reduction of the nickel oxide to $Ni^0$ of the order of 80%.

Example 12: Catalytic Tests: Performance in Selective Hydrogenation of a Mixture Containing Styrene and Isoprene ($A_{HYD1}$)

Catalysts A to H described in the examples above are tested with regard to the reaction for the selective hydrogenation of a mixture containing styrene and isoprene.

The composition of the feedstock to be selectively hydrogenated is as follows: 8 wt % styrene (supplier Sigma Aldrich®, purity 99%), 8 wt % isoprene (supplier Sigma Aldrich®, purity 99%) and 84 wt % n-heptane (solvent) (supplier VWR®, purity>99% Chromanorm HPLC). This composition corresponds to the initial composition of the reaction mixture. This mixture of model molecules is representative of a pyrolysis gasoline.

The selective hydrogenation reaction is carried out in a 500 ml stainless steel autoclave which is provided with a magnetically-driven mechanical stirrer and which is able to operate under a maximum pressure of 100 bar (10 MPa) and temperatures of between 5° C. and 200° C.

214 ml of n-heptane (supplier VWR®, purity>99% Chromanorm HPLC) and an amount of 3 ml of catalyst are added to an autoclave. The autoclave is closed and purged. The autoclave is then pressurized under 35 bar (3.5 MPa) of hydrogen. The catalyst is first reduced in situ, at 170° C. for 90 minutes under a hydrogen stream of 1 l/h/g (temperature rise gradient of 1° C./min) for catalysts A to H (which corresponds here to step e) of the preparation process according to the invention according to one embodiment). The autoclave is then brought to the test temperature equal to 30° C. At time t=0, approximately 30 g of a mixture containing styrene, isoprene, n-heptane, pentanethiol and thiophene are introduced into the autoclave. The reaction mixture then has the composition described above and stirring is started at 1600 rpm. The pressure is kept constant at 35 bar (3.5 MPa) in the autoclave using a storage cylinder located upstream of the reactor.

Another test was carried out for catalyst E, but with a catalyst reduction temperature of 400° C. for 16 hours.

The progress of the reaction is monitored by taking samples from the reaction medium at regular time intervals: the styrene is hydrogenated to give ethylbenzene, without hydrogenation of the aromatic ring, and the isoprene is hydrogenated to give methylbutenes. If the reaction is prolonged for longer than necessary, the methylbutenes are in their turn hydrogenated to give isopentane. The hydrogen consumption is also monitored over time by the decrease in pressure in a storage cylinder located upstream of the reactor. The catalytic activity is expressed in moles of $H_2$ consumed per minute and per gram of Ni.

The catalytic activities measured ($A_{HYD1}$) for catalysts A to H are given in table 3 below. They are related to the catalytic activity measured for catalyst E prepared under conventional reduction conditions (at a temperature of 400° C. for 16 hours under a hydrogen stream).

Example 13: Catalytic Tests: Performance in Hydrogenation of Toluene ($A_{HYD2}$)

Catalysts A to H described in the above examples are also tested with regard to the reaction for the hydrogenation of toluene. The selective hydrogenation reaction is carried out in the same autoclave as that described in example 12.

214 ml of n-heptane (supplier VWR®, purity>99% Chromanorm HPLC) and an amount of 3 ml of catalyst are added to an autoclave. The autoclave is closed and purged. The autoclave is then pressurized under 35 bar (3.5 MPa) of hydrogen. The catalyst is first reduced in situ, at 170° C. for 90 minutes under a hydrogen stream of 1 l/h/g (temperature rise gradient of 1° C./min) for catalysts A to H (which corresponds here to step e) of the preparation process according to the invention according to one embodiment). After addition of 216 ml of n-heptane (supplier VWR®, purity>99% Chromanorm HPLC), the autoclave is closed, purged, then pressurized under 35 bar (3.5 MPa) of hydrogen and brought to the test temperature, equal to 80° C. At time t=0, approximately 26 g of toluene (supplier SDS®, purity>99.8%) are introduced into the autoclave (the initial composition of the reaction mixture is then 6 wt % toluene/ 94 wt % n-heptane) and stirring is started at 1600 rpm. The pressure is kept constant at 35 bar (3.5 MPa) in the autoclave using a storage cylinder located upstream of the reactor.

The progress of the reaction is monitored by taking samples from the reaction medium at regular time intervals: the toluene is completely hydrogenated to give methylcyclohexane. The hydrogen consumption is also monitored over time by the decrease in pressure in a storage cylinder located upstream of the reactor. The catalytic activity is expressed in moles of $H_2$ consumed per minute and per gram of Ni.

The catalytic activities measured ($A_{HYD2}$) for catalysts A to H are given in table 3 below. They are related to the catalytic activity measured for catalyst E prepared under conventional reduction conditions (at a temperature of 400° C. for 16 hours under a hydrogen stream).

TABLE 3

| Catalyst | Reduction (° C.) | Content of $Ni^0$ (%) | $A_{HYD1}$ (%) | $A_{HYD2}$ (%) |
|---|---|---|---|---|
| A (in accordance) | 170° C., 16 h | 15 | 180 | 175 |
| B (in accordance) | 170° C., 16 h | 10 | 150 | 152 |
| C (in accordance) | 170° C., 16 h | 15 | 181 | 190 |
| D (not in accordance) | 170° C., 16 h | 15 | 60 | 70 |
| E (not in accordance) | 170° C., 16 h | 15 | <1 | <1 |
| E (not in accordance) | 400° C., 16 h | 15 | 100 | 100 |
| F (not in accordance) | 170° C., 16 h | 15 | 55 | 45 |
| G (not in accordance) | 170° C., 16 h | 15 | 93 | 102 |
| H (not in accordance) | 170° C., 16 h | 15 | 95 | 98 |

This clearly shows the improved $A_{HYD1}$ and $A_{HYD2}$ performance of catalysts A, B and C obtained by the preparation process according to the invention, compared to catalysts D to H not in accordance with the invention. For catalysts A, B and C, the nickel oxide is reduced at 170° C. to a level of 90% and has particles distributed in "semi eggshell". The process for preparing catalyst D does not include the addition of n-butanol in pre-impregnation, which has the effect of not distributing the nickel in semi-eggshell. Catalyst E has lower activity due to the conventional impregnation carried out without pre-impregnation of butanol. Catalyst F underwent a post-impregnation with butanol which does not allow an eggshell distribution of the nickel. Catalysts G and H are prepared with a step of pre-impregnation of toluene and propanol respectively. In these two cases, the nickel is distributed homogeneously throughout the catalyst grain. Catalysts G and H therefore have a much lower activity than catalyst A in terms of $A_{HYD1}$. This is explained by the distribution of Ni in "semi-eggshell" on catalysts A, B, and C, which gives them a markedly improved activity, in particular in rapid hydrogenation reactions. Catalyst E has lower activity due to the absence of NiCu, which does not make it possible to obtain reduced Ni, the active phase in hydrogenation, at 170° C.

The invention claimed is:

1. A process for preparing a catalyst comprising nickel and copper, in a proportion of 1% and 50% by weight of nickel element relative to the total weight of the catalyst, and in a proportion of 0.5% to 15% by weight of copper element relative to the total weight of the catalyst, and a porous alumina support, the support having a core and a crust at a periphery thereof, the nickel being distributed both over a crust at the periphery of the support, and at the core of the support, the thickness of said crust being between 2% and 15% of the diameter of the catalyst, the size of the nickel particles in the catalyst, measured in oxide form, being between 7 nm and 25 nm, said process comprises the following steps:
   a) either the porous support or the catalyst precursor obtained at the end of step d) is impregnated with a volume V1 of a butanol solution of between 0.2 and 0.8 times the total pore volume TPV of said support in order to obtain an impregnated support;
   b) the impregnated porous support obtained at the end of step a) is left to mature for 0.5 hour to 40 hours;
   c) the sequence of the following sub-steps is carried out:
      c1) either the matured impregnated porous support obtained at the end of step b), or the catalyst precursor obtained at the end of step d), is impregnated with a solution comprising at least one precursor of the nickel active phase;
      c2) optionally, the catalyst precursor obtained at the end of step c1) is dried at a temperature below 250° C.;
   d) the sequence of the following sub-steps is carried out:
      d1) either the porous support, or the matured impregnated porous support obtained at the end of step b), or the catalyst precursor obtained at the end of step c), is impregnated with at least one solution containing at least one copper precursor and one nickel precursor at a copper concentration in order to obtain, on the final catalyst, a content of between 0.5% and 15% by weight of copper element relative to the total weight of the final catalyst;
      d2) optionally, the catalyst precursor obtained at the end of step d1) is dried at a temperature below 250° C.;
   said step d) being carried out either before step a), or between steps b) and c), or after step c), it being understood that:
      i) when step d) is carried out before step a), then sub-steps c2) and d2) are compulsory;
      ii) when step d) is carried out between steps b) and c), then sub-step c2) is compulsory;
      iii) when step d) is carried out after step c), then sub-step d2) is compulsory.

2. The process as claimed in claim 1, wherein step b) is carried out at a temperature below or equal to 60° C.

3. The process as claimed in claim 1, wherein, in step a), an n-butanol solution is used.

4. The process as claimed in claim 1, wherein, when step d) is carried out before step a), the volume V2 of the solution comprising at least one precursor of the nickel active phase supplied in step c1) is such that V2=TPV−V1.

5. The process as claimed in claim 1, wherein, when step d) is carried out between steps b) and c), or after step c), the volume V2 of the solution comprising at least one precursor of the nickel active phase supplied in step c1) and the volume V3 of the solution comprising a nickel precursor and a copper precursor supplied in step d1) are such that V2+V3=TPV−V1.

6. The process as claimed in claim 1, wherein the copper precursor is copper acetate, copper acetylacetonate, copper nitrate, copper sulfate, copper chloride, copper bromide, copper iodide or copper fluoride.

7. The process as claimed in claim 1, wherein the precursor of the nickel active phase is nickel nitrate, nickel chloride, nickel acetate or nickel hydroxycarbonate.

8. The process as claimed in claim 1, said process further comprises a step c2') of calcining the dried catalyst precursor obtained at the end of step c2) at a temperature of between 250° C. and 600° C.

9. The process as claimed in claim 1, wherein, in step a), said volume V1 of said butanol solution is between 0.25 and 0.75 times the total pore volume TPV of said support.

10. The process as claimed in claim 1, wherein sub-steps c2) and/or d2) are carried out for a time of between 0.5 hour and 12 hours.

11. The process as claimed in claim 1, further comprising a step e) wherein the catalyst precursor obtained at the end of the sequence of steps a) to d) is reduced by bringing said catalyst precursor into contact with a reducing gas at a temperature above or equal to 150° C. and below 250° C.

12. The process as claimed in claim 1, wherein step d) is carried out before step a).

13. The process as claimed in claim 1, wherein step d) is carried out between steps b) and c).

14. The process as claimed in claim 1, wherein step d) is carried out after step c).

* * * * *